Nov. 11, 1941.  E. O. ENGELS ET AL  2,262,172
CONVEYER PLATE ASSEMBLY FOR BAKE OVENS
Filed Nov. 25, 1940

HARRY FEIGE
EUGENE OSCAR ENGELS
INVENTORS

BY
ATTORNEY

Patented Nov. 11, 1941

2,262,172

UNITED STATES PATENT OFFICE 2,262,172

CONVEYER PLATE ASSEMBLY FOR BAKE OVENS

Eugene Oscar Engels and Harry Feige, Saginaw, Mich., assignors to Baker Perkins Incorporated, Saginaw, Mich., a corporation of New York Application November 25, 1940, Serial No. 366,994

5 Claims. (Cl. 107—57)

This invention relates to traveling plate ovens wherein a chain conveyer carries a series of plates in edge-to-edge alignment through the baking chamber, presenting a continuous hearth on which bread loaves or other goods to be baked are placed in pans. It relates more particularly to a novel design and construction of the plate units, its principal object being to provide an improved platform on which the pans can be placed with assurance that the top, bottom, sides, and ends of each dough piece shall be baked to a substantially uniform color.

Traveling plate ovens have heretofore customarily been built with solid plates of metal or soapstone, so that the heat was transmitted to the bottom of a loaf by conduction and to its sides and top largely by radiation. Heat transmitted by convection currents was a negligible part of the total baking heat reaching the loaf. Since the plates, however, necessarily had a slight clearance at their joining edges, convection currents of hot gases would rise through these joints, subjecting the nearby pan walls to more heating effect than the other walls of the pans which were positioned above the solid plate surface and were therefore heated almost entirely by radiation from the plate. That side of the loaf which was adjacent an edge of a plate tended therefore to be baked to a darker color than the other sides. At the ends of the plates, i. e., along the sides of the conveyer the excess heating effect of this flow of hot gases was still more pronounced. Expensive baffle construction has had to be used along the full length of the oven to stop these currents or deflect them away from the edges of the conveyer.

The customary arrangement of the pans used in commercial baking also contributes to uneven baking in ovens having solid conveyer plates. The baking pans are customarily strapped together closely side-by-side in sets of three or more, which are usually spaced on the traveling oven hearth farther apart than the pans in each set, so that the pan walls bounding the set receives more radiant heat than the more closely adjacent walls within the sets. The ends of all loaves and also one side of each loaf at the ends of a set are thus apt to be darker than the remaining sides.

To avoid these difficulties and permit a uniform free circulation of convection currents around all sides of the pans, plates have been entirely omitted in single-pass traveling ovens and a very costly open conveyer used instead, on which the pans were carried directly upon a plurality of parallel chains presenting spaced upstanding points, or upon spaced bars provided with similar pan-supporting projections and carried by chains at either side of the baking chamber. These isolated projections were so spaced and arranged that contact of the pans with hot conveyer metal would be kept to a minimum. Such projections did, however, transmit to the pans the extra heat stored in the chain metal during its return travel in the oven and thereby produced isolated small brown or burned spots on the loaf bottoms.

Single-lap traveling hearth ovens (in which the bottom run returns empty to the loading end) are characterized by the fact that the conveyer absorbs heat during its return run, which stored heat is transmitted to the baking pans in addition to that supplied directly in the baking run. The transmission of this extra heat presents certain problems if unequal baking of the loaf surfaces, particularly their bottoms, is to be avoided. It also reduces the flexibility of the oven by limiting the extent to which the ratio of top to bottom heat may be varied for baking goods of different kinds. Heretofore it has been assumed to be necessary either to employ solid plates or to use open carriers of minimum thermal capacity having the fewest and smallest possible points of contact with the pans.

In multiple-pass tray conveyer ovens, as distinguished from traveling plate ovens, part of the foregoing difficulties has been avoided by using perforated metal sheets, panels of expanded metal, or heavy wire mesh instead of solid tray bottoms, so that the baking heat is supplied less by conduction and indirect radiation from the tray bottoms and more by convection currents passing through the tray bottoms around all sides of the pans. However, since the trays in ovens of this kind carry pans throughout their travel, being loaded and unloaded at the same station, excess heat conducted from the supporting surface presents little or no problem, since no heat is accumulated in the tray structure at any time, but is continuously transmitted to the pans and their contents.

On the other hand, in traveling plate ovens the thermal capacity of the plate structure is an important factor in baking and in building ovens for baking different kinds of goods it is desirable first to minimize this capacity for storing heat, and secondly, to provide plates of various heat capacities within this minimum range. My invention makes this possible for the first time in plate conveyers by a simple and inexpensive plate construction.

The use of these perforate materials in traveling plate ovens will affect the distribution of top and bottom heat, and sufficiently open material can permit the passage of sufficient heat from the bottom heating units to the top of the oven, even though the usual top heating elements be turned off or omitted entirely. These materials, however, have other practical limitations. Any perforate plate material having a given proportion of voids to solid areas has a definite and constant effect upon the circulation and transfer of oven heat. A wire mesh of given weight and spacing of the wires will produce a balance between the top and bottom heat in a given oven which will be best suited for baking bread loaves of a particular size or kind. If, however, this mesh be employed in an oven of different proportions and heating equipment, it will produce an entirely different temperature above the conveyer from the first oven when its bottom heat is identical. Thus in re-equipping existing ovens or in designing new ovens for different types of goods, different weights and meshes of screen material must be used. The manufacturer of bake ovens would therefore have to stock, or have readily available many kinds of wire mesh or other prefabricated perforate material on hand in order to best meet the definite conditions presented by specific ovens. Our invention provides a plate assembly which permits economical construction of a plate of any given heat capacity and with any desired ratio of solid to open areas from a stock of only a few sizes of standard material.

Another feature of the invention is that it insures even heating of the pan bottoms. Solid baking plates causes uneven browning of loaf bottoms, since the sets of pans soon become warped and dented so that the pan bottoms will not touch the plates at all points. Consequently the loaf bottoms tend to over-bake where the pans are in good contact with the heated plates, or if just enough heat to bake these areas properly is supplied, the other plates which are not in such good heat-transmitting relation to the plates are insufficiently browned. The art has attempted to overcome this difficulty by the use of wire mesh superimposed on the plates to support the pans, so that bottom heat was applied partly by conduction and partly by radiation, but it became apparent that the air space between the impervious plate and the pans retarded heat transfer undesirably. Furthermore, the other above cited disadvantages of solid plate conveyers were not overcome.

A further advantage of our novel pan-carrying surface is that it makes for a low-cost plate assembly, as compared with prefabricated perforate plate, expanded metal, or wire mesh stock. It is inherently rigid enough to take its load without any material flexing, whereas the materials mentioned must be stretched upon a frame in order to be flat under load. The frame structure must accordingly be rigid and tends to be heavy. The plate units embodying our invention can be materially lighter than the plates or trays heretofore used in bake ovens.

The present invention solves the foregoing problems and realizes all of the stated advantages in traveling hearth ovens by providing a novel grid-like pan-supporting surface of metal rods spaced so that the gaps between rods constitute 30 to 50 per cent of the total projected area. It also provides a novel plate structure incorporating this grid surface.

In baking on these plates a large part of the bottom heat is carried to the pans by convection currents from below the conveyer, so that even though all parts of the pan may not rest upon the grid surface, nearly as much heat is transmitted to the pan bottom at these points as in the areas which are in contact with the spaced rods. The rods furthermore are spaced closely enough together so that their retained heat does not produce perceptible dark stripes on the loaf bottom. The relatively small amount of heat stored in each rod radiates laterally and is spread by conduction in the pan bottom over an area on the loaf wide enough to overlap the areas similarly heated by the adjacent rods.

Convection currents of hot gas rising between the rods rise at relatively uniform rates past all of the end and side walls of the pans on the grid surface, heating these uniformly and to virtually the same temperature as the bottoms. The ends, sides, and bottom, of all of the loaves are thus browned uniformly.

Other features and advantages of the invention are described in the following specification.

Referring to the drawing, Fig. 1 represents diagrammatically in side elevation an oven conveyer incorporating the plate structure of the invention:

Figure 1:
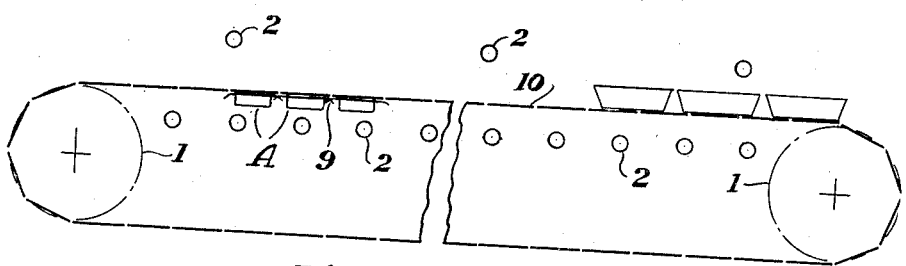
Figure 2:
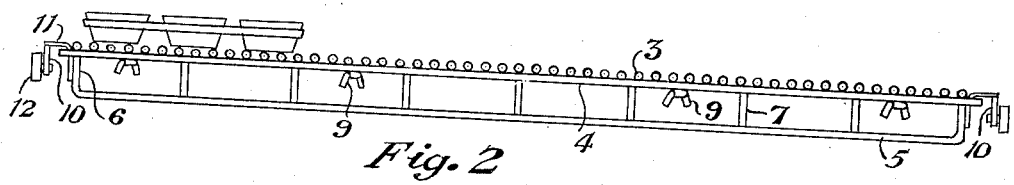
Fig. 2 is a side elevation of the improved plate assembly showing its mode of attachment to the conveyer chain.

Referring to Fig. 1, the invention is applied to an oven of the traveling plate type in which a pair of chains 10 at the sides of the oven travel around sprockets 1 at its opposite ends. Heating units 2 which may be gas burners or other known heating elements, are disposed in the oven above and below the upper conveyer run. The plate assembly A of the invention is attached to the chain in known manner, as by angle brackets 11, secured to the ends of the plate assembly and to the links of the chain 10. The chain 10 has rollers 12 of known kind journaled on the chain pintles and adapted to travel in the usual way on rails (not shown) along the sides of the baking chamber.

Figure 3:
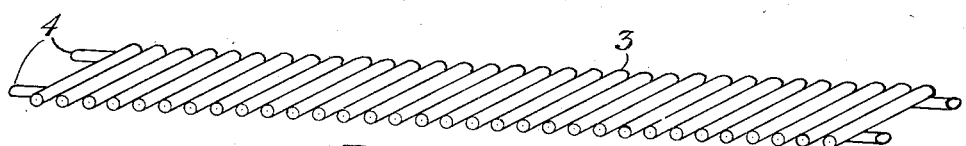
Fig. 3 is a perspective view of the pan-supporting grid surface of the invention.

The plate assembly A, which embodies the invention, consists of a grid-like top (see Fig. 3) made up of parallel spaced metal rods 3 which are welded to two or more extending stills 4, preferably of similar rod stock. The grid rods 3 are $\frac{3}{16}$ to $\frac{3}{8}$ inch in diameter, and are so spaced on the sills 4 that the spaces represent 30 and 50 per cent of the total projected area of the grid surface. The grid rods 3 are conveniently made from round rod stock as shown, but may also be made from stock of polygonal cross-section mounted upon the sills 4 to present a corner to the pans and thus minimize the area of metal-to-metal contact.

Within the limits stated different sizes of grid bars differently spaced may be used for the pan-supporting surface to provide plate assemblies of various thermal capacities and varying ratios of open to projected areas, so that more or less heat will be stored and transmitted by the grid surface to the baking pans and the rate at which currents of hot gases rise through the plates may be varied. A wide variety of plate surfaces may thus be made from a stock of two or three sizes of rod material, welding the rods to the sills at different intervals.

Figure 4:
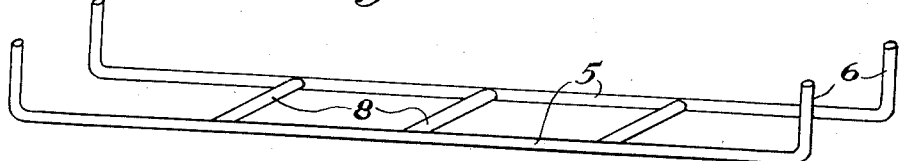
Fig. 4 shows a part of the brace and truss assembly to which the grid surface is attached.
Figure 5:
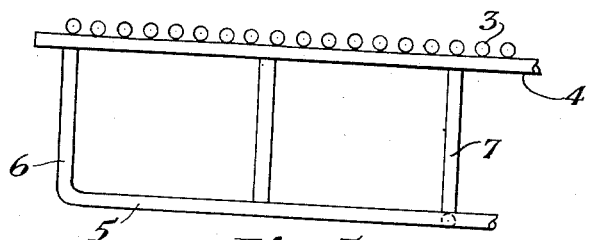
Fig. 5 is an enlarged side view of one end of the plate shown in Fig. 2.
Figure 6:
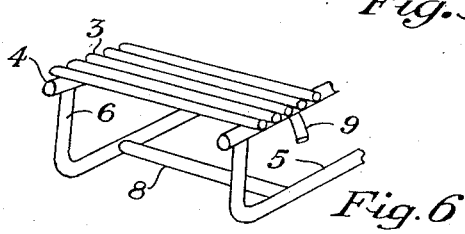
Fig. 6 is a perspective view of one end of the plate assembly.

Truss assemblies are provided to stiffen the plate structure and consist of a rod 5 for each sill 4 extending parallel to it having its ends bent upwardly at 6 to present posts which are welded to the sill 4. Vertical posts 7 are welded between each sill 4 and a rod 5, and with member 5 constitute a truss member for each sill. The two truss members of the plate assembly shown are spaced apart and stiffened by transversely extending struts 8, to the members 5 (see Fig. 4). The resulting plate assembly is strong and stiff so that it is not subject to deflection under usual conditions of load, and yet is considerably lighter than the solid plate assemblies heretofore used in oven conveyers of this kind or the trays of swing tray ovens. Two or more articulation fingers are provided for each plate assembly, consisting of rods 9 welded beneath the sills 4 and extending diagonally across the plate assembly. They extend beyond the edges of the plate and their projecting ends are bent downward, so that they engage beneath the sills of the adjacent plates to minimize relative tilting of the plates and to prevent undue misalignment and possible overlapping of the edges of adjacent plates when they travel around the conveyer sprockets, thus preventing possible interference of the plates. These oven plates permit a substantial economy in the oven heating system. By judicious selection of the rod diameters and their spacing heating units above the conveyer may be obviated entirely in some cases, although preferably the rods are selected and arranged so that the heat passing through the plates shall be just short of the total amount of top heat required in a given oven. A few adjustable top heat units 2 are then provided as indicated in Fig. 1 to permit easy control of the ratio between top and bottom temperatures.

Another advantage of this plate construction is that a conveyer is readily built to suit any type of heat supply in any oven. With exposed gas burners or in direct heating by circulating combustion gases, heat transfer is largely by convection. A somewhat more open plate construction with different thermal capacity is necessary with radiant heating elements than with heat supply of the kind first mentioned. The construction of the proper plate for each kind of heat supply is simple and economical when building an over or in altering the method of heating an existing oven.

Having thus described our invention, what we claim and desire to secure by Letters Patent is:

1. A plate assembly for traveling ovens adapted to be attached at its ends to conveyer chains traveling lengthwise of an oven chamber and carried substantially in the plane of said chains, comprising in combination, a plurality of longitudinal sills, a truss assembly for each sill consisting of a member spaced below and parallel to the sill, posts connecting each sill and truss member, laterally extending struts connecting said truss assemblies below the sills, a pan-carrying grid surface consisting of uniformly spaced parallel rods $\frac{3}{16}$ to $\frac{3}{8}$ inch in diameter secured transversely to said longitudinal sills, the spaces between said rods constituting not less than thirty nor more than fifty per cent of the total projected area of said grid surface, and articulation fingers consisting of one or more rods on each tray assembly welded diagonally beneath said sills presenting ends extending beyond the edge of said plate assembly to engage beneath the sills of the adjacent plate assemblies to prevent excessive tilting of said assemblies relative to each other.

2. A plate assembly for traveling ovens adapted to be attached at its ends to conveyer chains traveling lengthwise of an oven chamber and carried substantially in the plane of said chains, comprising in combination, a plurality of longitudinal sills, a truss assembly for each sill consisting of a member spaced below and parallel to the sill, posts connecting each sill and truss member, laterally extending struts connecting said truss assemblies below the sills, a pan-carrying grid surface consisting of uniformly spaced parallel rods $\frac{3}{16}$ to $\frac{3}{8}$ inch in diameter secured transversely to said longitudinal sills, the spaces between said rods constituting not less than thirty nor more than fifty per cent of the total projected area of said grid surface.

3. A plate assembly for traveling ovens adapted to be attached at its ends to conveyer chains traveling lengthwise of an oven chamber and carried substantially in the plane of said chains, comprising in combination, longitudinal sills, a truss secured beneath each sill, rigid horizontal members connecting said trusses below the sills, and a pan-carrying grid surface consisting of uniformly spaced parallel bars $\frac{3}{16}$ to $\frac{3}{8}$ inch wide at their thickest transverse portion secured transversely to said longitudinal sills, the spaces between said bars constituting not less than thirty nor more than fifty per cent of the total projected area of said grid surface.

4. In a plate assembly for traveling ovens adapted to be attached at its ends to conveyer chains traveling lengthwise of an oven chamber and carried substantially in the plane of said chains, a pan-supporting member comprising parallel sills having thereon uniformly spaced parallel bar members $\frac{3}{16}$ to $\frac{3}{8}$ inch in width and thickness formed at their uppermost portions for minimum contact area with the pans, the spaces between said rods constituting not less than thirty nor more than fifty per cent of the total projected area of said member.

5. In a plate assembly for the conveyer of a traveling hearth oven a grid-like pan-carrying plate structure comprising uniformly spaced parallel rods of substantial thermal capacity, the spaces between adjacent rods constituting between thirty per cent and fifty per cent of the total projected area of said plate structure.

EUGENE OSCAR ENGELS.
HARRY FEIGE.